F. Hamblin.
Extension Table.
Nº 91,332. Patented Jun. 15, 1869.
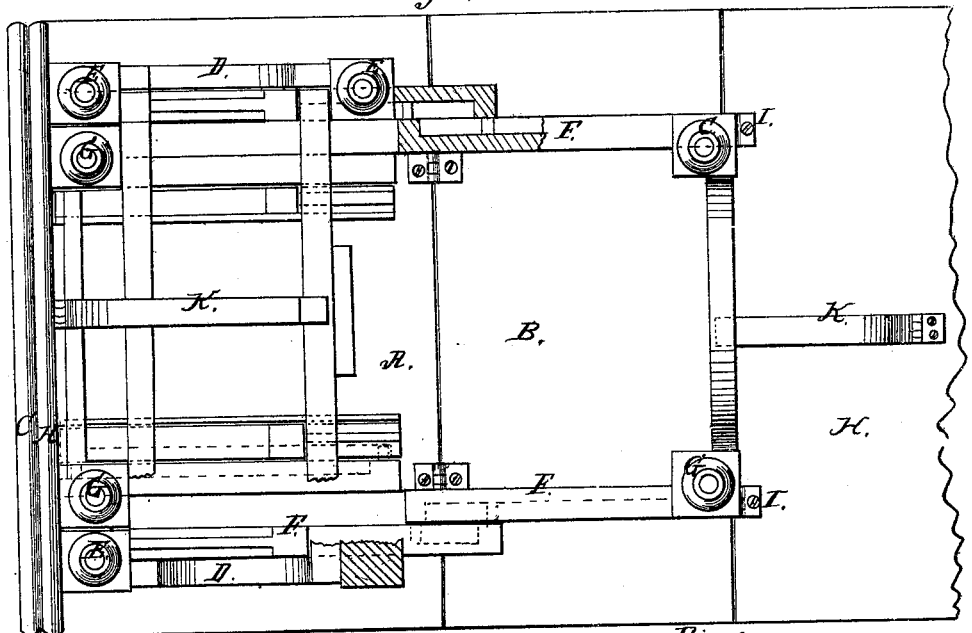
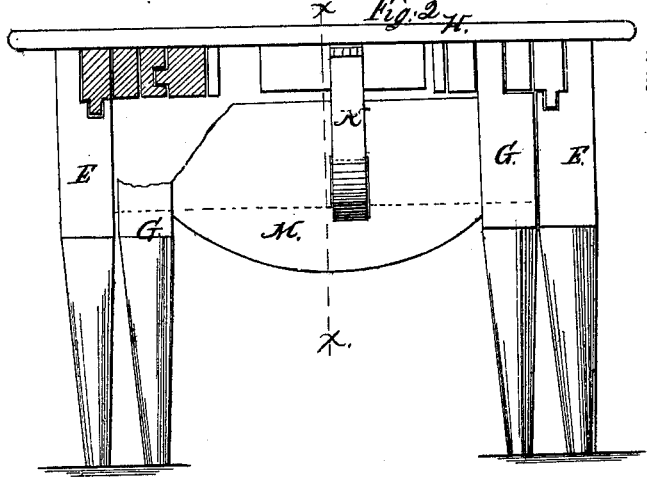
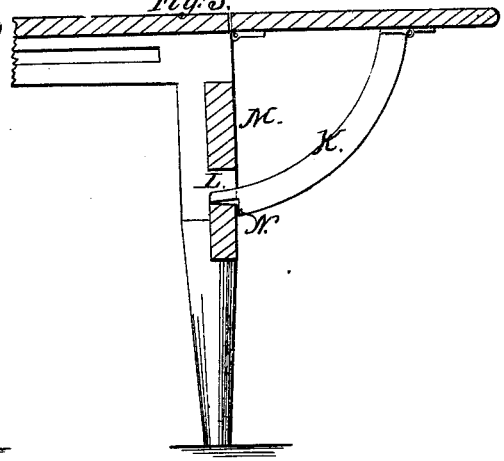
Witnesses.
Hinchman
Geo. W. Vosbrook.
Inventor.
F. Hamblin
per Munn & Co.
Attorneys.

United States Patent Office.

FLOYD HAMBLIN, OF MADRID SPRINGS, NEW YORK.

Letters Patent No. 91,332, dated June 15, 1869.

IMPROVED EXTENSION-TABLE.

The Schedule referred to in these Letters Patent and making part of the same.

*To all whom it may concern:*

Be it known that I, FLOYD HAMBLIN, of Madrid Springs, in the county of St. Lawrence, and State of New York, have invented a new and useful Improvement in Extension-Tables; and I do hereby declare that the following is a full, clear, and exact description thereof, which will enable others skilled in the art to make and use the same, reference being had to the accompanying drawings, forming part of this specification.

This invention relates to improvements in extension-tables, designed to provide an improved arrangement of the same, whereby all the leaves or sections of the top will be permanently hinged to the frame, and the table be capable of the necessary extension or contraction.

The invention consists in the application, to an ordinary table, having a permanent top and leaves hinged to each side thereof, of other leaves, hinged to legs arranged to slide in and out under the first-mentioned leaves, and to be supported in the same horizontal plane therewith, by circular braces, when all the leaves are spread, all as hereinafter more fully specified.

Figure 1 represents a plan of the under side of my improved table, with one side closed, and the other extended, and partly sectioned;

Figure 2 represents an end view, partly sectioned; and

Figure 3 represents a section taken on the line $x\ x$ of fig. 2.

Similar letters of reference indicate corresponding parts.

A represents the top, and B C, the leaves of an ordinary rectangular table, with hinged leaves. The leaf B is extended, and the one, C, is folded down.

To the transverse bars D of the frame of this table, whereon the legs E are permanently connected, I connect sliding extension-bars, F, arranged in sets for extending at both sides, and provided with legs, G.

To the outer ends of these extension-bars I hinge leaves, H, as shown at I, and I provide them with hinged curved braces, K, which, when the leaves are folded down, slide through passages, L, in the broad transverse braces M, between the posts G, and project under the table, as shown in fig. 1, but which assume the position shown in fig. 3, when the table is extended, and the leaves spread, supporting the said leaves in the spread condition by engaging the shoulders N against the corners of the bars M, at the outer ends of the passages L, through which the said braces slide.

The leaves B and C are supported in the spread condition by the extension-bars F, when they are drawn out.

When the leaves H are folded down, their upper edges fall sufficiently low to pass under the leaves B C, and they slide inward far enough for the said leaves B C to fold down upon the outer sides thereof, as represented in fig. 1.

The braces K are raised to disengage the shoulders N from their seat on the cross-bars M, when the leaves H are to be folded.

The extension-bars F may, if desired, be made capable of extending beyond the outer edges of the leaves B and C, and detachable leaves interposed in the spaces between the hinged leaves B C K.

Having thus described my invention,

I claim as new, and desire to secure by Letters Patent—

The combination, with the table A, having hinged leaves B C, of the extension-arms F and legs G, carrying hinged leaves H, provided with the braces K, and all arranged substantially as specified.

FLOYD HAMBLIN.

Witnesses:
D. D. SMEAD,
C. A. CHANDLER.